US012800908B2

(12) United States Patent
Fu

(10) Patent No.: US 12,800,908 B2
(45) Date of Patent: Nov. 17, 2026

(54) COMPOSITE COLOR WHEEL MODULE AND PROJECTION DEVICE

(71) Applicant: Coretronic Corporation, Hsin-Chu (TW)

(72) Inventor: Tsung-Hsiang Fu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 223 days.

(21) Appl. No.: 18/384,888

(22) Filed: Oct. 30, 2023

(65) Prior Publication Data

US 2024/0142766 A1 May 2, 2024

(30) Foreign Application Priority Data

Oct. 31, 2022 (CN) ......................... 202211344603.4

(51) Int. Cl.
*G02B 26/00* (2006.01)
*G03B 21/20* (2006.01)
*G03B 33/08* (2006.01)

(52) U.S. Cl.
CPC ......... *G02B 26/008* (2013.01); *G03B 21/204* (2013.01); *G03B 33/08* (2013.01)

(58) Field of Classification Search
None
See application file for complete search history.

(56) References Cited

U.S. PATENT DOCUMENTS

| | | | | |
|---|---|---|---|---|
| 2013/0258639 | A1* | 10/2013 | Hu | G03B 21/204 362/84 |
| 2014/0118991 | A1 | 5/2014 | Lin et al. | |
| 2020/0127172 | A1 | 4/2020 | Hsu et al. | |
| 2024/0094614 | A1* | 3/2024 | Kaneda | G02F 1/1336 |

FOREIGN PATENT DOCUMENTS

| | | | |
|---|---|---|---|
| CN | 205450551 | U | 8/2016 |
| CN | 206594438 | U | 10/2017 |
| CN | 206819041 | U | 12/2017 |
| CN | 107703705 | A | 2/2018 |
| TW | 201523116 | A | 6/2015 |

OTHER PUBLICATIONS

The Office Action, dated Aug. 1, 2026, in counterpart China Application No. 202211344603.4.

* cited by examiner

*Primary Examiner* — Dung T Nguyen

(57) ABSTRACT

A composite color wheel module includes a substrate, a wavelength conversion layer, and a wavelength selection layer. The substrate includes a wavelength conversion region and a wavelength selection region. A material of the substrate is selected from at least one of nitrogen alumina, magnesium oxide, magnesium aluminum spinel, yttrium aluminum garnet, aluminum nitride, beryllium oxide, yttrium oxide, yttrium zirconium dioxide, gallium arsenide, zinc sulfide, zinc selenide, magnesium fluoride, and calcium fluoride. The wavelength conversion layer is arranged in the wavelength conversion region. The wavelength selection layer is arranged in the wavelength selection region. A surface of the wavelength selection region has a first surface roughness less than 0.02 um. The disclosure further provides a projection device including the composite color wheel module. The composite color wheel module and the projection device have the effect of reducing volume and weight, and improving the diversity and reliability of structural design.

10 Claims, 9 Drawing Sheets

COMPOSITE COLOR WHEEL MODULE AND PROJECTION DEVICE

CROSS-REFERENCE TO RELATED APPLICATION

This application claims the priority benefit of China application serial no. 202211344603.4, filed on Oct. 31, 2022. The entirety of the above-mentioned patent application is hereby incorporated by reference herein and made a part of this specification.

FIELD OF THE DISCLOSURE

The disclosure relates to a color wheel module, and more particularly to a composite color wheel module and a projection device using the composite color wheel module.

BACKGROUND OF THE DISCLOSURE

In a conventional composite fluorescent wheel, a filter substrate and a fluorescent substrate are integrated, and then the filter substrate and the fluorescent substrate are connected to a motor. However, this will increase the complexity of the composite fluorescent wheel structure design and reliability risk, and limit the optical path design of the projection device. For example, the conventional composite fluorescent wheel may only use a blue light reflective glass attached to the fluorescent substrate, and blue light penetrating glass cannot be selected according to the optical path requirements. In addition, the complex structural design of the conventional composite fluorescent wheel will lead to an increase in the volume and weight of the composite fluorescent wheel, thereby limiting the selection of motors.

The information disclosed in this "BACKGROUND OF THE DISCLOSURE" section is only for enhancement understanding of the background of the disclosure and therefore it may contain information that does not form the prior art that is already known to a person of ordinary skill in the art. Furthermore, the information disclosed in this "BACKGROUND OF THE DISCLOSURE" section does not mean that one or more problems to be solved by one or more embodiments of the disclosure were acknowledged by a person of ordinary skill in the art.

SUMMARY OF THE DISCLOSURE

The disclosure provides a composite color wheel module, which reduces volume and weight while improving structural design diversity and reliability.

The disclosure further provides a projection device, which increases the available types of optional drivers and optical path design, and improves the reliability of the projection device.

Other advantages and objectives of the disclosure may be further illustrated by the technical features broadly embodied and described as follows.

In order to achieve one or a portion of or all of the objectives or other objectives, the composite color wheel module provided by the disclosure includes a substrate, a wavelength conversion layer, and a wavelength selection layer. The substrate includes a wavelength conversion region and a wavelength selection region. A material of the substrate is selected from at least one of nitrogen alumina, magnesium oxide, magnesium aluminum spinel, yttrium aluminum garnet, aluminum nitride, beryllium oxide, yttrium oxide, yttrium zirconium dioxide, gallium arsenide, zinc sulfide, zinc selenide, magnesium fluoride, and calcium fluoride. The wavelength conversion layer is arranged in the wavelength conversion region. The wavelength selection layer is arranged in the wavelength selection region. A surface of the wavelength selection region has a first surface roughness less than 0.02 um. The disclosure further provides a projection device including the composite color wheel module.

In an embodiment of the disclosure, the projection device further includes an illumination system, a light valve, and a projection lens. The illumination system is configured to provide an illumination beam. The light valve is arranged on a transmission path of the illumination beam to convert the illumination beam into an image beam. The projection lens is arranged on a transmission path of the image beam. The illumination system includes a light source and a composite color wheel module. The light source is configured to provide a beam. The composite color wheel module is arranged on a transmission path of the beam and includes a substrate, a wavelength conversion layer, and a wavelength selection layer. The substrate includes a wavelength conversion region and a wavelength selection region. The wavelength conversion layer is arranged in the wavelength conversion region and configured to convert part of the beam into a converted beam. The wavelength selection layer is arranged in the wavelength selection region and on the transmission path of the converted beam and configured to generate at least a portion of the illumination beam.

Compared to the structure formed by splicing two separated substrates (i.e., filter substrate and fluorescent substrate), the composite color wheel module in the embodiment of the disclosure uses a single substrate to carry a wavelength conversion layer and a wavelength selection layer, which can reduce volume and weight, improve structural design diversity and reliability, and thus increase the number of motor types and optical path designs available for the projection device using this composite color wheel module, and improve the reliability of the projection device.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the disclosure may be practiced. In this regard, directional terminology, such as “top”, “bottom”, “front”, “back”, etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of “including”, “comprising”, or “having” and variations thereof herein is meant to encompass the items listed thereafter and equivalents thereof as well as additional items. Unless limited otherwise, the terms “connected”, “coupled”, and “mounted” and variations thereof herein are used broadly and encompass direct and indirect connections, couplings, and mountings. Similarly, the terms “facing”, “faces”, and variations thereof herein are used broadly and encompass direct and indirect facing, and “adjacent to” and variations thereof herein are used broadly and encompass directly and indirectly “adjacent to”. Therefore, the description of “A” component facing “B” component herein may contain the situations that “A” component facing “B” component directly or one or more additional components is between “A” component and “B” component. Also, the description of “A” component “adjacent to” “B” component herein may contain the situations that “A” component is directly “adjacent to” “B” component or one or more additional components is between “A” component and “B” component. Accordingly, the drawings and descriptions will be regarded as illustrative in nature and not as restrictive.

Figure 1A:
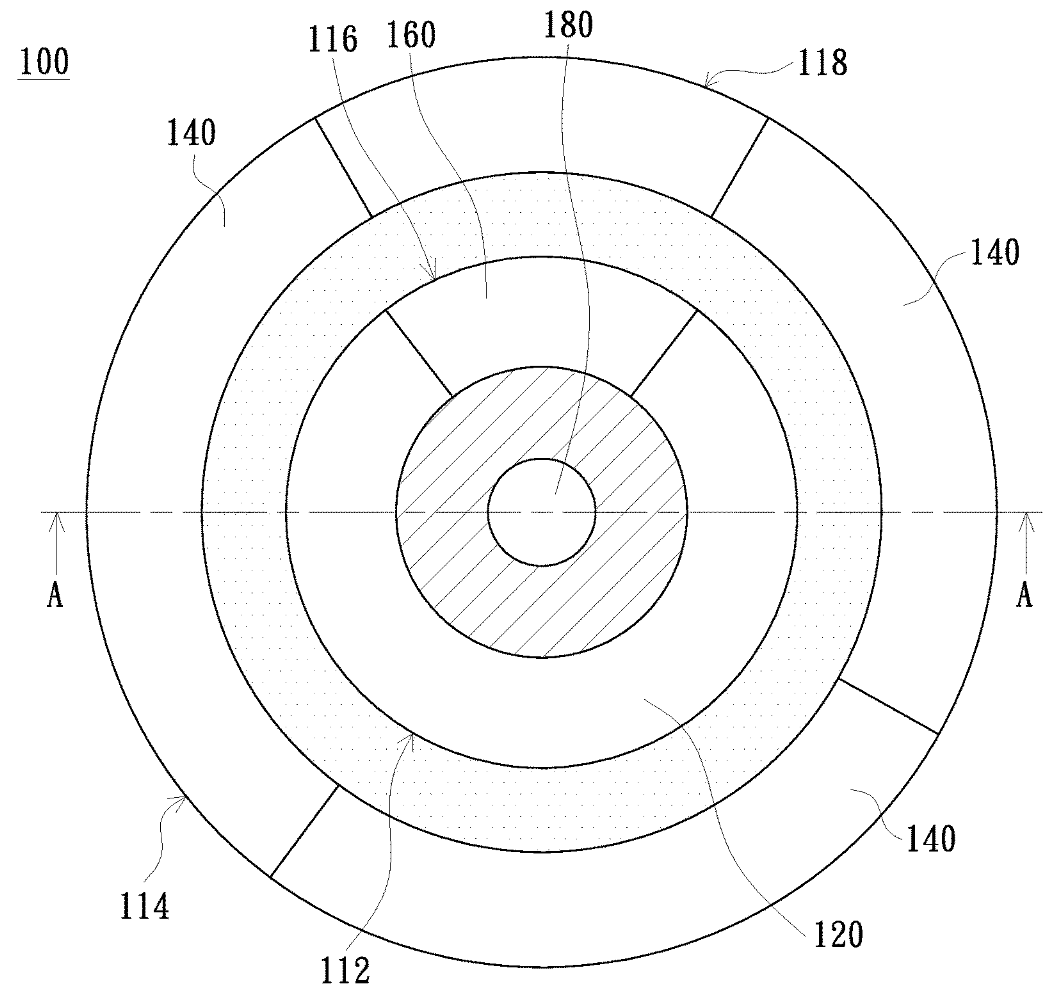
FIG. 1A is a schematic top view of a composite color wheel module according to an embodiment of the disclosure.
Figure 1B:
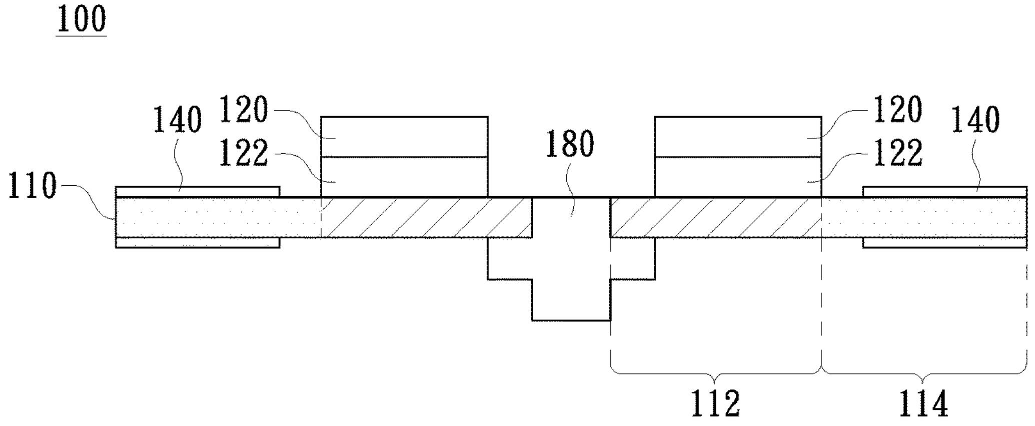
FIG. 1B is a schematic cross-sectional view of the composite color wheel module, taken along the line A-A in FIG. 1A.

FIG. 1A is a schematic top view of a composite color wheel module according to an embodiment of the disclosure. FIG. 1B is a schematic cross-sectional view of the composite color wheel module, taken along the line A-A in FIG. 1A. Please refer to FIGS. 1A and 1B. The composite color wheel module 100 of this embodiment includes a substrate 110, a wavelength conversion layer 120, and a wavelength selection layer 140. The substrate 110 has a wavelength conversion region 112 and a wavelength selection region 114. The wavelength conversion layer 120 is arranged in the wavelength conversion region 112, and the wavelength selection layer 140 is arranged in the wavelength selection region 114. Specifically, the substrate 110 may be a circular ring substrate, the wavelength conversion region 112 may be a closed or non-closed circular ring, and the wavelength selection region 114 may be a closed or non-closed circular ring and surround the wavelength conversion region 112 (i.e., the wavelength conversion region 112 is located between the wavelength selection region 114 and a center of the substrate 110), but the disclosure is not limited thereto.

The material of the substrate 110 is selected from at least one of nitrogen alumina, magnesium oxide, magnesium aluminum spinel, yttrium aluminum garnet, aluminum nitride, beryllium oxide, yttrium oxide, yttrium zirconium dioxide, gallium arsenide, zinc sulfide, zinc selenide, magnesium fluoride, and calcium fluoride. In addition, the substrate 110 has at least one of the following features: the thermal conductivity is greater than or equal to 20 W/m·K and less than or equal to 500 W/m·K, the refractive index is greater than or equal to 1.2 and less than or equal to 1.8, the heat resistance temperature is greater than or equal to 1200° C. and less than or equal to 2800° C., the hardness is greater than or equal to 40 $kg/mm^2$ and less than or equal to 1950 $kg/mm^2$, and the density is greater than or equal to 1.7 $g/cm^3$ and less than or equal to less than or equal to 4 $g/cm^3$, for example. In one embodiment, the substrate 110 can be prepared in the following manner, but the disclosure does not limit the preparation method of the substrate 110. First, a powder selected from at least one material, including nitrogen alumina, magnesium oxide, magnesium aluminum spinel, yttrium aluminum garnet, aluminum nitride, beryllium oxide, yttrium oxide, yttrium zirconia, gallium arsenide, zinc sulfide, zinc selenide, magnesium fluoride, and calcium fluoride, is poured into a mold. Next, the powder is pressurized to 15000 to 30000 psi according to different material characteristics (the pressurization process is in an atmospheric/vacuum environment). Then, after turning the powder into particles, the particles are heated to 1000 to 3000° C. according to different material characteristics, and cooled and solidified to form the substrate 110.

The substrate 110 can be processed to change the surface roughness and transmittance of the substrate 110, resulting in a higher transmittance and lower surface roughness compared to the unprocessed substrate 110. The processing method includes polishing, and the processing area can be the entire substrate 110 or a portion of the substrate 110 adjusted according to needs. Specifically, the surface of the wavelength selection region 114 of the substrate 110 in this embodiment has a first surface roughness, and the first surface roughness (such as Ra, average or arithmetic average of profile height deviations from the mean line) is less than 0.02 um and greater than 0 um. In addition, the transmittance of the wavelength selection region 114 is, for example, 80% to 100% (the transmittance of the substrate 110, excluding the wavelength selection layer 140), and is preferably greater than or equal to 90% and less than or equal to 100%. The surface of the wavelength conversion region 112 has a second surface roughness, which is greater than the first surface roughness, for example. The second surface roughness is 2 to 20 times the first surface roughness, preferably 5 to 15 times. Therefore, the transmittance of the wavelength selection region 114 is greater than that of the wavelength conversion region 112. For example, the surface of the wavelength selection region 114 has a first surface roughness with lower roughness after, for example, polishing treatment, so that the transmittance of the wavelength selection region 114 is, for example, between 80% and 100%. The surface of the wavelength conversion region 112 does not undergo polishing treatment, thus having a second surface roughness with high roughness. The transmittance of the wavelength conversion region 112 is, for example, between 50% and 70%, but the disclosure is not limited thereto. In other embodiments, the surface of the wavelength conversion region 112 can also be polished according to requirements.

The wavelength conversion layer 120 of this embodiment is arranged in the wavelength conversion region 112. The wavelength conversion layer 120 is configured to convert a beam into a converted beam of different wavelengths. For example, the wavelength conversion layer 120 can convert blue light into yellow light (converted beam). In another embodiment, the wavelength conversion region 112 can be divided into a plurality of sub-regions according to requirements, and different wavelength conversion layers can be arranged in the sub-regions to provide converted beams of different colors (different wavelengths). The materials of the wavelength conversion layer 120 are, for example, fluorescent materials, phosphorescent materials, or quantum dot materials, but the disclosure is not limited thereto. In addition, a reflection layer 122 can be arranged between the wavelength conversion layer 120 and the substrate 110 to improve the utilization rate of the converted beam. The reflection layer 122 is arranged on the substrate 110 by, for example, coating, but the disclosure is not limited thereto. Thus, in the case where the wavelength conversion region 112 of the substrate 110 has low transmittance and a reflection layer 122 is arranged, the light leakage from the other side of the substrate 110 can be avoided.

The substrate 110 of this embodiment further includes, for example, a wavelength maintenance region 116 connected to the wavelength conversion region 112. The wavelength maintenance region 116 forms a ring (e.g., in a closed circular shape) with the wavelength conversion region 112 on the substrate 110. The wavelength maintenance region 116 of this embodiment can, for example, allow a beam to pass therethrough without changing the wavelength of the beam. In this embodiment, the surface roughness of the surface of the substrate 110 corresponding to the wavelength maintenance region 116 is equal to the first surface roughness, resulting in a high transmittance of the beam in the wavelength maintenance region 116. In addition, an anti-reflection layer 160 can be arranged in the wavelength maintenance region 116 to further increase the transmittance of the beam in the wavelength maintenance region 116. The anti-reflection layer 160 and the wavelength conversion layer 120 are, for example, arranged on the same side of the substrate 110.

The wavelength selection layer 140 of this embodiment is arranged in the wavelength selection region 114. The wavelength selection layer 140 is, for example, a filter layer configured to allow a beam of a specific wavelength range to pass therethrough while filtering out the beam out of the specific wavelength range. In this embodiment, the quantity of the wavelength selection layers 140 is, for example, three, such as a red wavelength selection layer, a green wavelength selection layer, and a blue wavelength selection layer. The disclosure does not limit the quantity and wavelength selection range of the wavelength selection layers 140. In addition, the wavelength selection layers 140 of this embodiment are arranged on the opposite sides of the substrate 110 (e.g., arranged on the upper and lower surfaces). In other embodiments, the wavelength selection layer 140 can be arranged on one side of the substrate 110. In addition, the substrate 110 further includes, for example, a penetration region 118 connected to the wavelength selection region 114. The penetration region 118 is configured to allow a beam to pass therethrough. The wavelength selection region 114 and the penetration region 118 form a circular ring shape, such as a closed circular ring, on the substrate 110. The surface roughness of the surface of the substrate 110 corresponding to the penetration region 118 is, for example, equal to the first surface roughness, and the penetration region 118 is optional provided with an anti-reflection layer.

The composite color wheel module 100 further includes, for example, a motor 180. The motor 180 is connected to the substrate 110 and configured to drive the substrate 110 to rotate.

The composite color wheel module 100 of the embodiment of the disclosure uses a single substrate 110 to carry the wavelength conversion layer 120 and the wavelength selection layer 140, thereby reducing volume and weight and improving structural design diversity and reliability. For example, the appearance of the substrate 110 is, for example, a flat disc, that is, the upper surface and the lower surface of the substrate each are planar, which can selectively have roughness but not ladder structure or bump structure.

Figure 2:
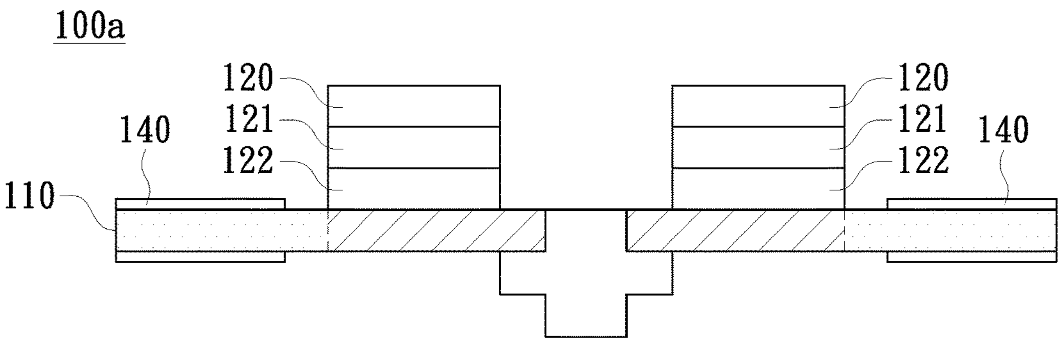
FIG. 2 is a cross-sectional schematic view of a composite color wheel module according to another embodiment of the disclosure.

FIG. 2 is a cross-sectional schematic view of a composite color wheel module according to another embodiment of the disclosure. Please refer to FIG. 2. The composite color wheel module **100*a* of this embodiment is similar to the composite color wheel module 100 of FIG. 1B. The main difference is that the composite color wheel module 100*a* of this embodiment further includes an adhesive layer 121 arranged between the wavelength conversion layer 120 and the reflection layer 122. In another embodiment where the composite color wheel module 100*a* does not include the reflection layer 122, the adhesive layer 121 is arranged, for example, between the wavelength conversion layer 120 and the substrate 110**.

Figure 3:
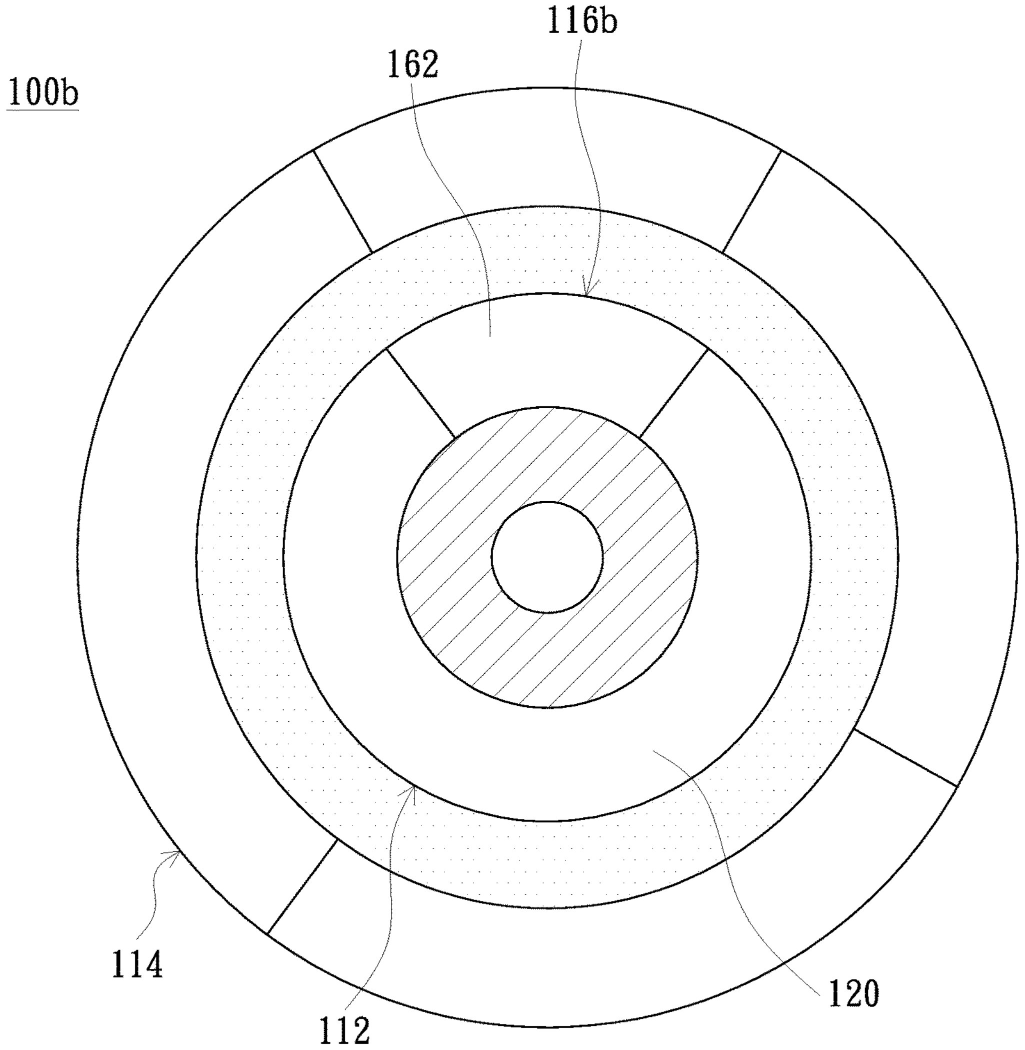
FIG. 3 is a schematic top view of a composite color wheel module of another embodiment of the disclosure.

FIG. 3 is a schematic top view of a composite color wheel module of another embodiment of the disclosure. Please refer to FIG. 3. The composite color wheel module **100*b* of this embodiment is similar to the composite color wheel module 100 of FIG. 1A. The main difference is that the wavelength maintenance region 116*b* of the composite color wheel module 100*b* in this embodiment is configured to reflect beams. The surface of the substrate 110 corresponding to the wavelength maintenance region 116*b* is not polished and has a high surface roughness (e.g., the second surface roughness), thus providing a reflection function. In addition, a reflection layer 162 can be arranged on the wavelength maintenance region 116*b*** to provide a reflection function with a high reflection ratio.

Figure 4:
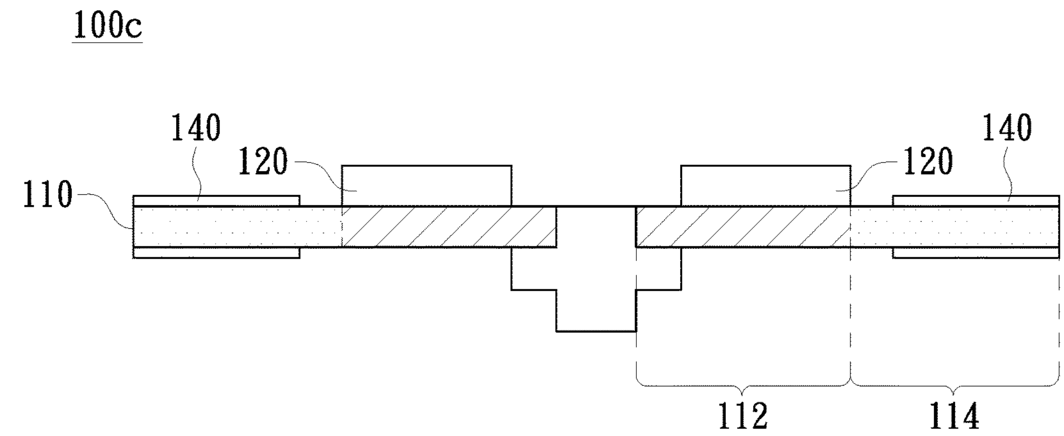
FIG. 4 is a schematic cross-sectional view of a composite color wheel module according to another embodiment of the disclosure.

FIG. 4 is a schematic cross-sectional view of a composite color wheel module according to another embodiment of the disclosure. Please refer to FIG. 4. The composite color wheel module 100*c* of this embodiment is similar to the composite color wheel module 100 of FIG. 1B. The main difference is that the reflection layer 122 in FIG. 1B is not arranged between the wavelength conversion layer 120 and the substrate 110*c* of the composite color wheel module 100*c* in this embodiment. The wavelength conversion region 112 of the substrate 110*c* in this embodiment is not polished and has a high surface roughness, thus providing a reflection function. Compared to the composite color wheel module 100 of FIG. 1B, the composite color wheel module 100*c* in this embodiment can achieve the function of reflecting beams without the need for a reflection layer, thus reducing the process steps and improving the reliability of the composite color wheel module 100*c*.

Figure 5:
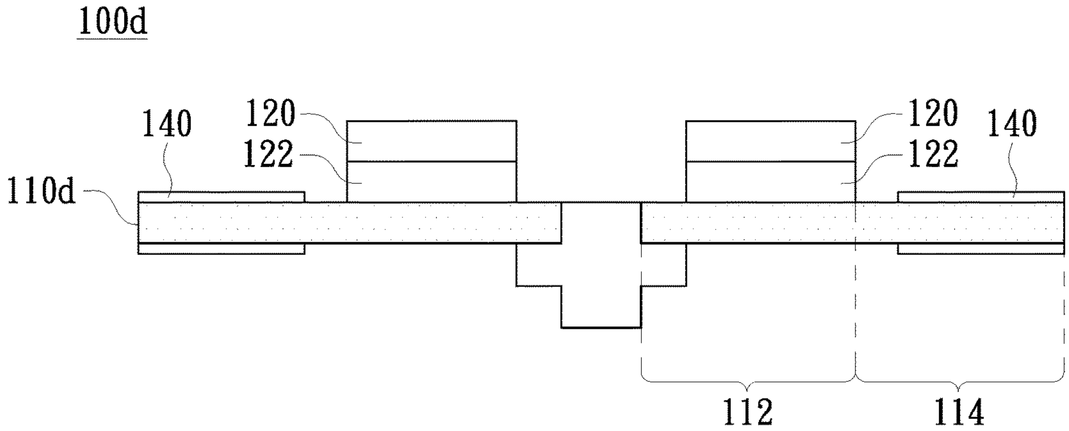
FIG. 5 is a schematic cross-sectional view of a composite color wheel module according to another embodiment of the disclosure.

FIG. 5 is a schematic cross-sectional view of a composite color wheel module according to another embodiment of the disclosure. Please refer to FIG. 5. The composite color wheel module 100*d* of this embodiment is similar to the composite color wheel module 100 of FIG. 1B. The main difference is that the wavelength conversion region 112 of the substrate 110*d* in this embodiment is polished and has a low surface roughness and a high transparency. In this embodiment, the wavelength selection region 114 and the wavelength conversion region 112 may have the same first surface roughness.

Figure 6:
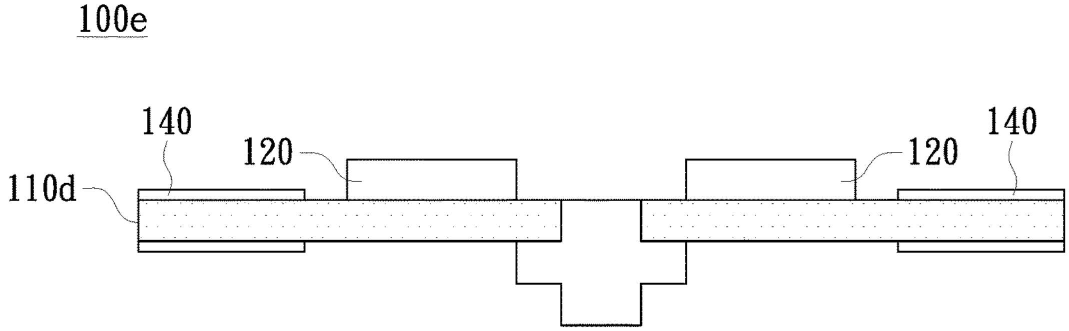
FIG. 6 is a schematic cross-sectional view of a composite color wheel module according to another embodiment of the disclosure.

FIG. 6 is a schematic cross-sectional view of a composite color wheel module according to another embodiment of the disclosure. Please refer to FIG. 6. The composite color wheel module 100*e* of this embodiment is similar to the composite color wheel module 100*d* of FIG. 5. The main difference is that the reflection layer 122 in FIG. 5 is not arranged between the wavelength conversion layer 120 and the substrate 110*d* in the composite color wheel module 100*e* of this embodiment. In this embodiment, both the wavelength conversion region and the wavelength selection region are configured to allow the beam to pass therethrough.

Figure 7A:
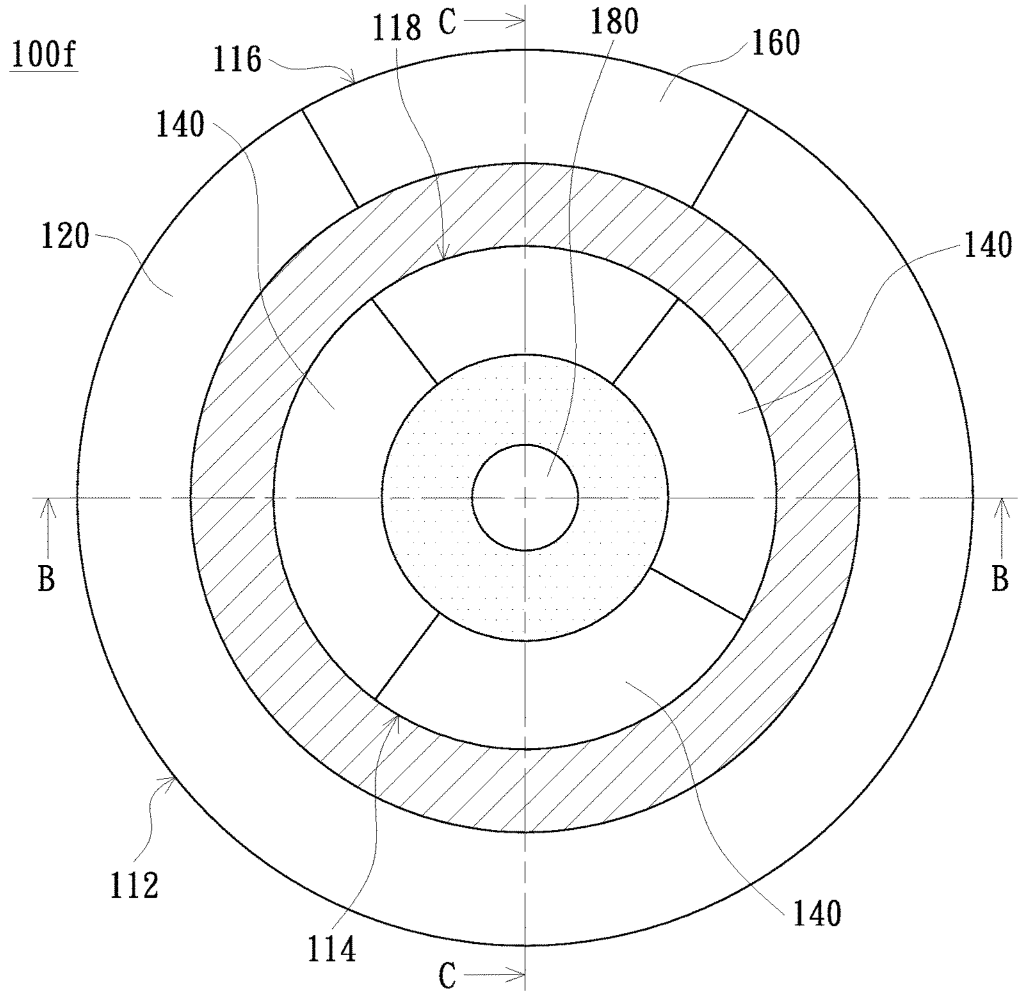
FIG. 7A is a schematic top view of a composite color wheel module according to another embodiment of the disclosure.
Figure 7B:
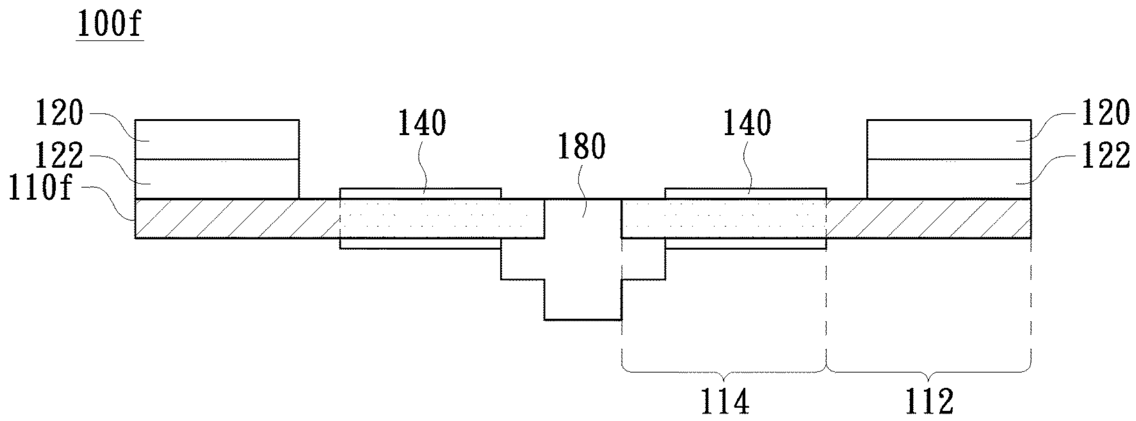
FIG. 7B is a schematic cross-sectional view of the composite color wheel module, taken along the line B-B in FIG. 7A.

FIG. 7A is a schematic top view of a composite color wheel module according to another embodiment of the disclosure. FIG. 7B is a schematic cross-sectional view of the composite color wheel module, taken along the line B-B in FIG. 7A. Please refer to FIGS. 1A, 1B, 7A, and 7B. The composite color wheel module 100*f* of this embodiment is similar to the composite color wheel module 100 of FIGS. 1A and 1B. The main difference is that the wavelength conversion region 112, for example, surrounds the wavelength selection region 114 in the composite color wheel module 100*f* of this embodiment; that is, the wavelength selection region 114 is closer to the structural center of the substrate 110*f* than the wavelength conversion region 112.

Figure 8:
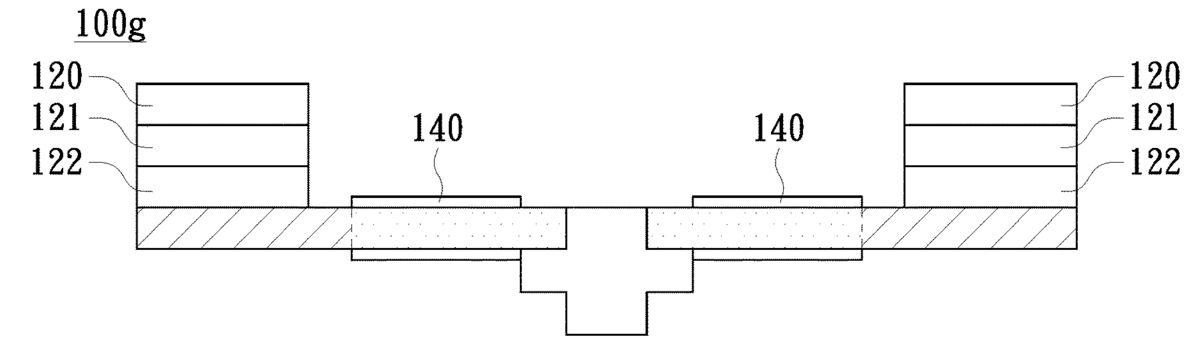
FIG. 8 is a schematic cross-sectional view of a composite color wheel module according to another embodiment of the disclosure.

FIG. 8 is a schematic cross-sectional view of a composite color wheel module according to another embodiment of the disclosure. Please refer to FIG. 8. The composite color wheel module 100*g* of this embodiment is similar to the composite color wheel module 100*f* of FIG. 7B. The main difference is that the composite color wheel module 100*g* of this embodiment further includes an adhesive layer 121 arranged between the wavelength conversion layer 120 and the reflection layer 122.

Figure 9:
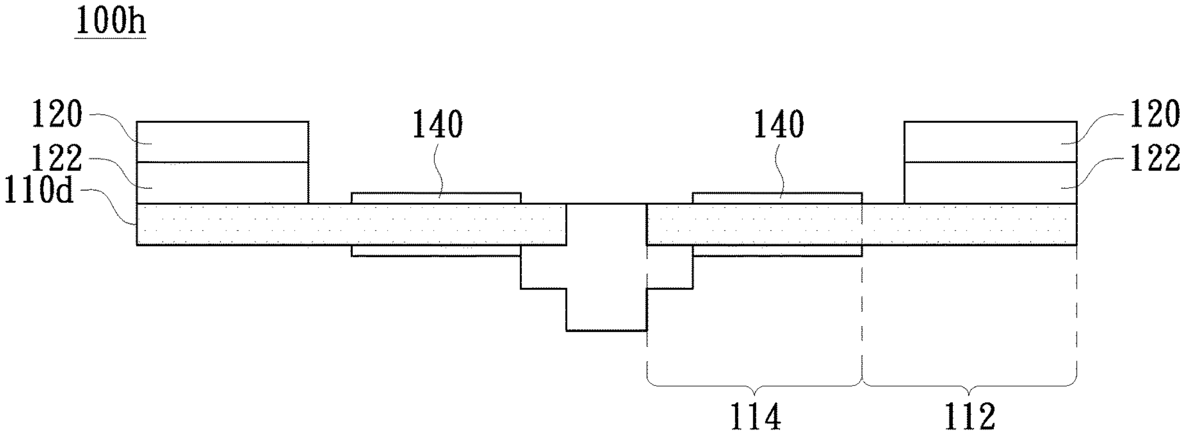
FIG. 9 is a schematic cross-sectional view of a composite color wheel module according to another embodiment of the disclosure.

FIG. 9 is a schematic cross-sectional view of a composite color wheel module according to another embodiment of the disclosure. Please refer to FIG. 9. The composite color wheel module 100*h* of this embodiment is similar to the composite color wheel module 100*f* of FIG. 7B. The main difference is that the wavelength conversion region 112 of the substrate 110*d* in this embodiment is polished and has a low surface roughness. In this embodiment, the wavelength selection region 114 and the wavelength conversion region 112 may have the same first surface roughness.

Figure 10:
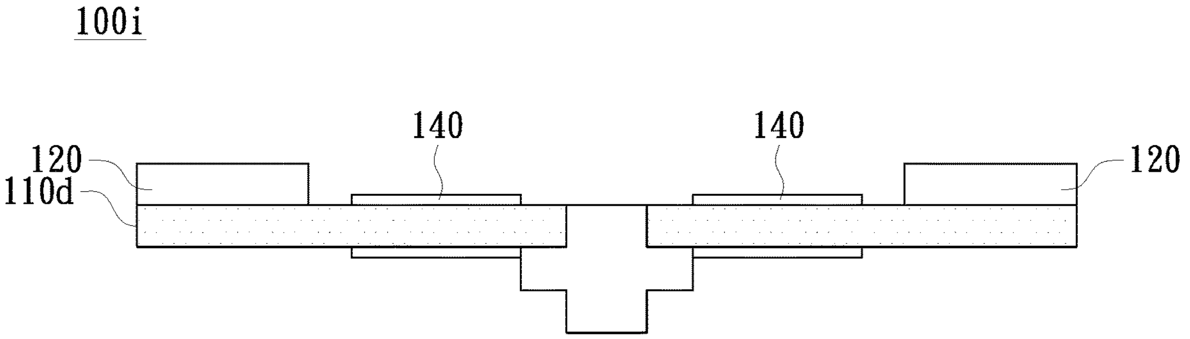
FIG. 10 is a schematic cross-sectional view of a composite color wheel module according to another embodiment of the disclosure.

FIG. 10 is a schematic cross-sectional view of a composite color wheel module according to another embodiment of the disclosure. Please refer to FIG. 10. The composite color wheel module 100*i* of this embodiment is similar to the composite color wheel module 100*h* of FIG. 9. The main difference is that the reflection layer 122 in FIG. 9 is not arranged between the wavelength conversion layer 120 and the substrate 110*d* in the composite color wheel module 100*i* of this embodiment.

Figure 11:
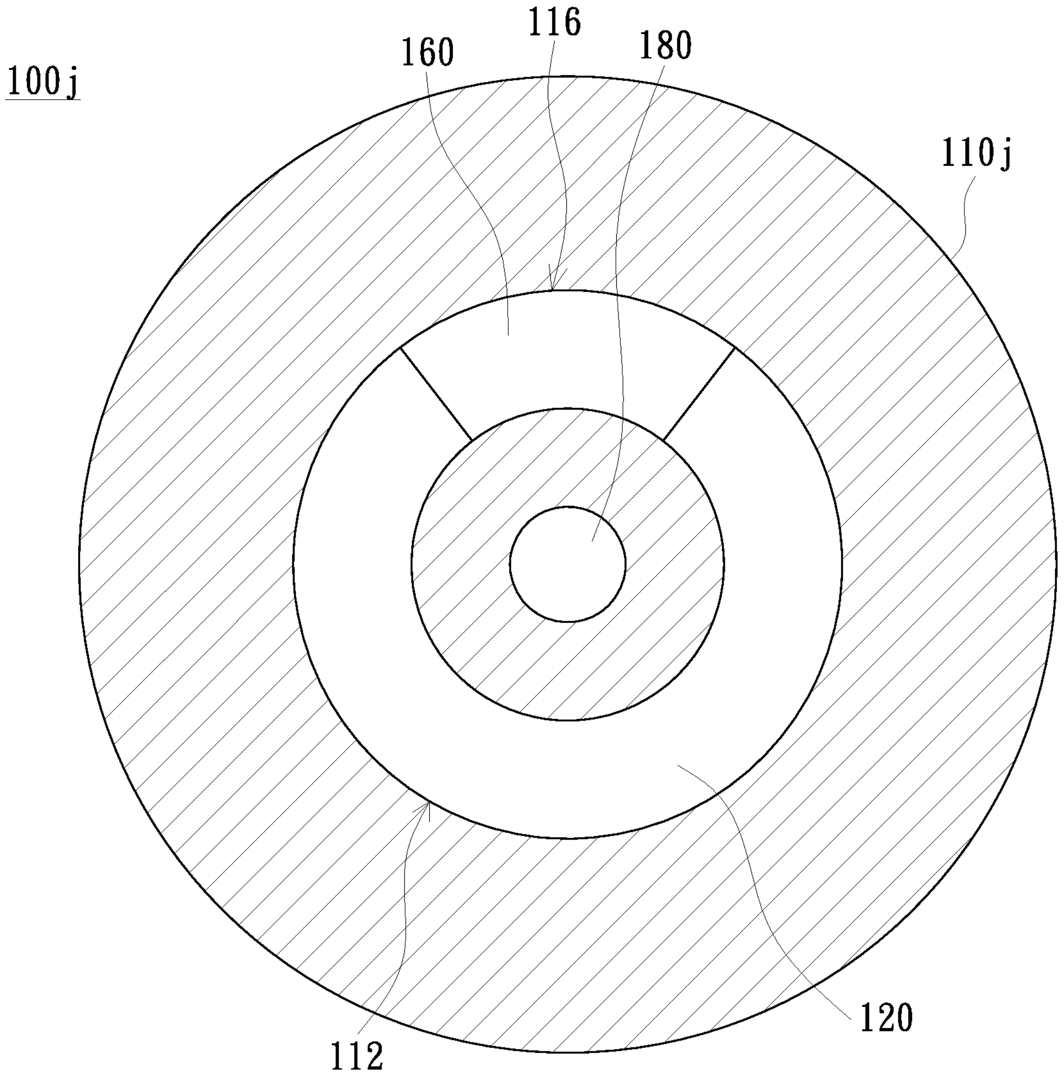
FIG. 11 is a schematic top view of a composite color wheel module according to another embodiment of the disclosure.

FIG. 11 is a schematic top view of a composite color wheel module according to another embodiment of the disclosure. Please refer to FIG. 11. The surface of the substrate 110*j* of the composite color wheel module 100*j* in this embodiment corresponding to the wavelength maintenance region 116 is polished, while the remaining areas, including the wavelength conversion region 112, are not polished. For example, the wavelength maintenance region 116 is provided with an anti-reflection layer 160, or a reflection layer can be arranged according to the needs.

Figure 12A:
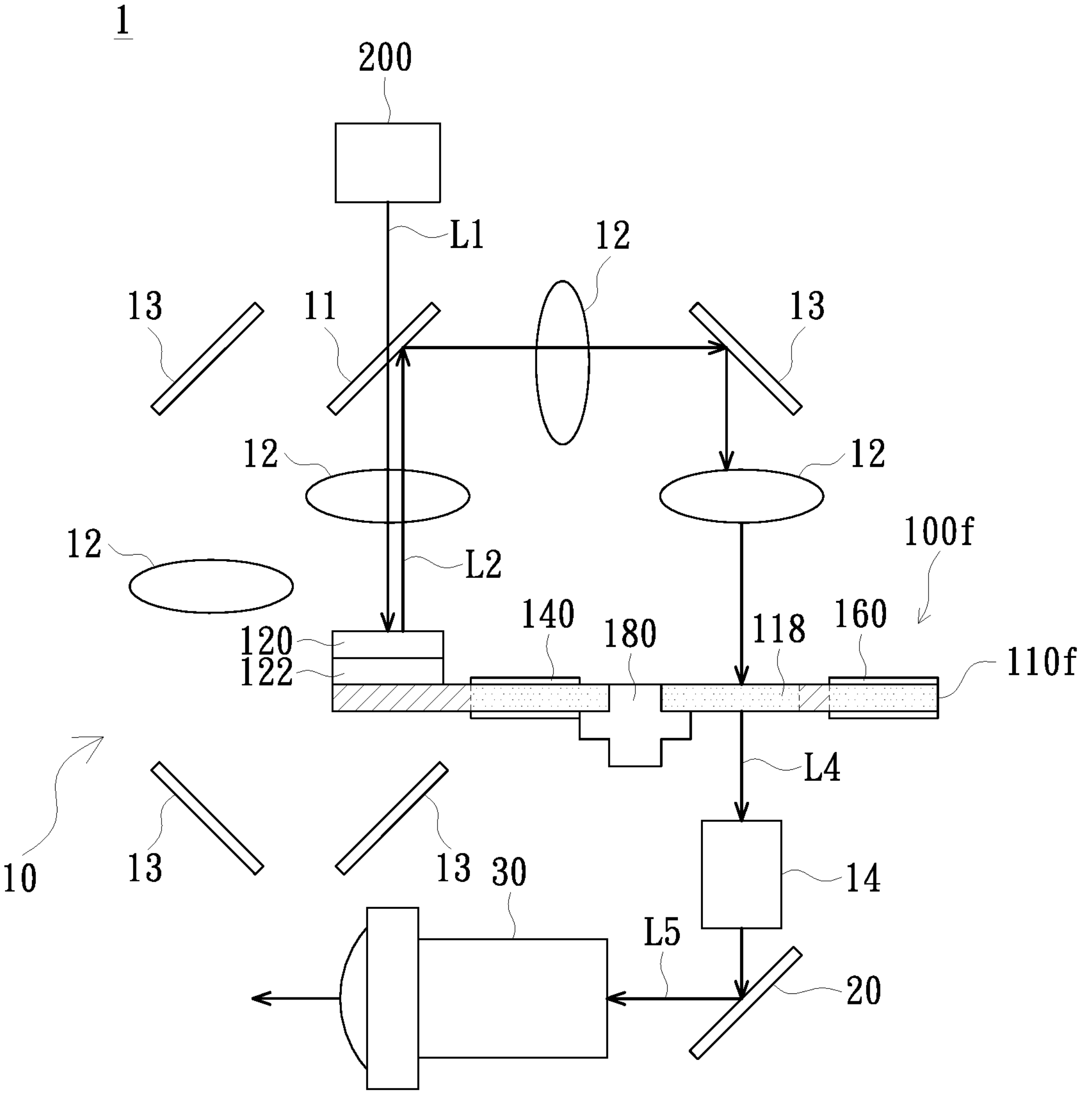
FIGS. 12A and 12B are schematic views of the optical path of a projection device in different states according to an embodiment of the disclosure.
Figure 12B:
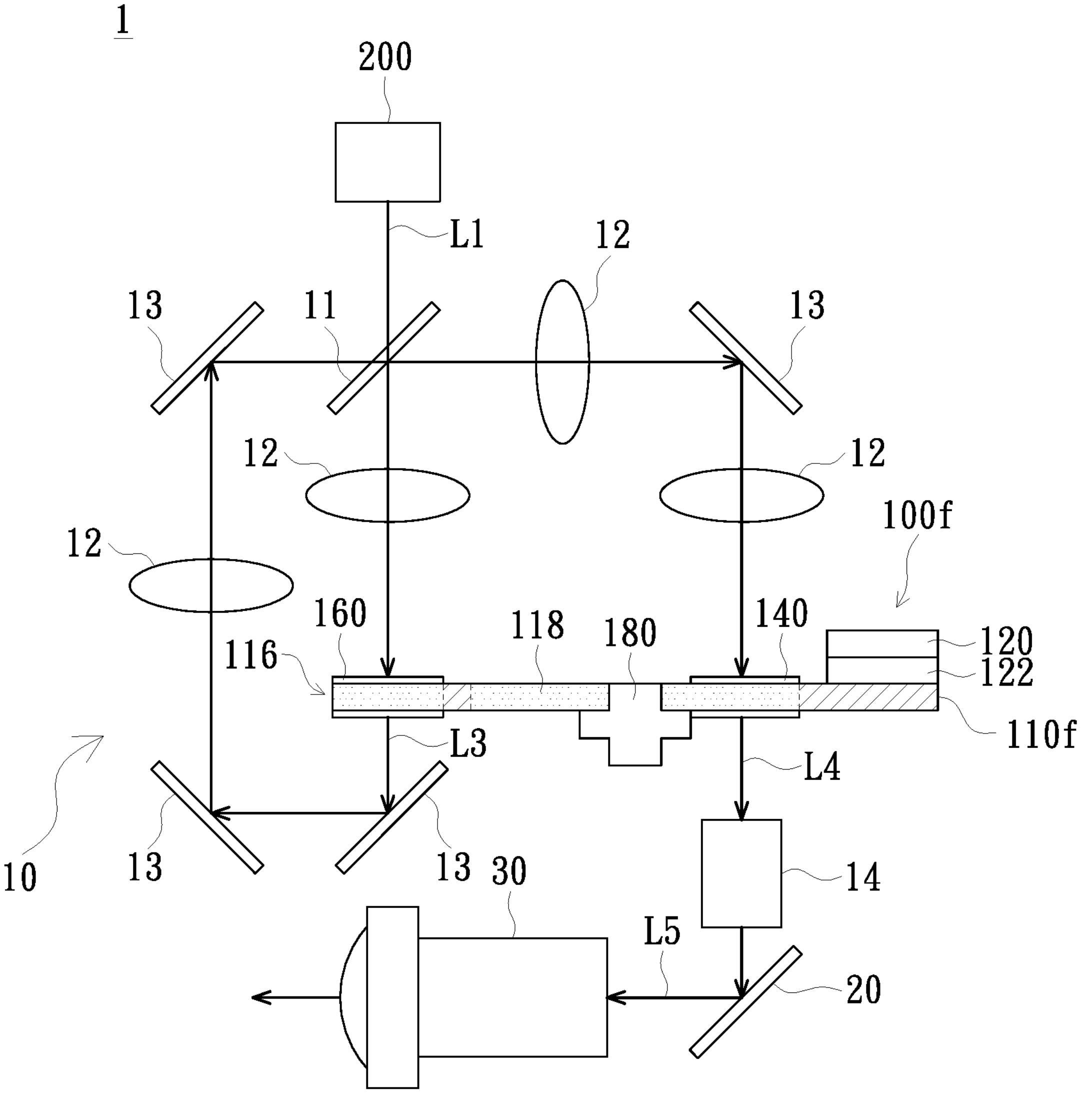

FIGS. 12A and 12B are schematic views of the optical path of a projection device in different states according to an embodiment of the disclosure. Please refer to FIG. 12A first. The projection device 1 of the disclosure includes an illumination system 10, a light valve 20, and a projection lens 30. The illumination system 10 is configured to provide an illumination beam L4. The light valve 20 is arranged on the transmission path of the illumination beam L4 to convert the illumination beam L4 into an image beam L5. The projection lens 30 is arranged on the transmission path of the image beam L5. The illumination system 10 includes a light source 200 and a composite color wheel module. The projection device 10 of this embodiment is illustrated by the composite color wheel module 100*f* of FIG. 7A. It should be noted that the composite color wheel module 100*f* depicted in FIGS. 12A and 12B is a cross-sectional schematic diagram taken along the line C-C in FIG. 7A.

Further, the light source 200 of the illumination system 10 is configured to provide the beam L1. The composite color wheel module 100*f* is arranged on the transmission path of the beam L1. The beam L1 takes turns irradiating onto the wavelength conversion layer 120 (the wavelength conversion region 112) and the wavelength maintenance region 116 when the substrate 110*f* rotates. In FIG. 12A, the wavelength conversion layer 120 moves onto the transmission path of the beam L1 and converts a portion (such as most) of the beam L1 into a converted beam L2. The wavelength selection layer 140 is arranged on the transmission path of the converted beam L2 and generates at least a portion of the illumination beam L4. The illumination beam L4 is transmitted to the light valve 20 and then converted into the image beam L5. The image beam L5 is then transmitted to the projection lens 30, and the projection lens 30 projects the image beam L5 out of the projection device 1.

Specifically, the light source 200 of this embodiment includes, for example, a light-emitting diode (LED) or a laser diode (LD). The beam L1 provided by the light source 200 is, for example, a blue light beam, but the disclosure is not limited thereto. The beam L1 is converted into, for example, a yellow converted beam L2 by the wavelength conversion layer 120 when the beam L1 is irradiated onto the wavelength conversion layer 120. The converted beam L2 is then transmitted to the wavelength selection layer 140 located in the wavelength selection region 114. In terms of design, at least a portion of the converted beam L2 can take turns passing through the red wavelength selection layer (the wavelength selection layer 140) and the green wavelength selection layer (the wavelength selection layer 140) to generate red and green beams, respectively. In the embodiment where the substrate has a penetration region 118, at least a portion of the converted beam L2, for example, can take turns passing through the penetration region 118, the red wavelength selection layer, and the green wavelength selection layer.

Next, please refer to FIGS. 7A and 12B. The beam L1 passes through (penetrates) the wavelength maintenance region 116 (hereinafter the non-converted beam L3 represents the beam passing through the wavelength maintaining region 116) when the beam L1 is irradiated onto the wavelength maintenance region 116. The surface roughness of the surface of the substrate 110*f* corresponding to the wavelength maintenance region 116 is, for example, equal to the first surface roughness. Thus, the beam L1 has high transmittance in the wavelength maintenance region 116. The opposite sides of the substrate corresponding to the wavelength maintenance region 116 each are provided with an anti-reflection layer 160. However, the anti-reflection layer 160 can be arranged on only one side of the substrate in another embodiment of the disclosure, and the disclosure is not limited thereto. In terms of design, the non-converted beam L3 can be transmitted to the blue wavelength selection layer 140. The non-converted beam L3 passes through the blue wavelength selection layer 140 and is converted into a blue beam. The illumination beam L4 includes at least one of the red beam, the green beam, and the blue beam.

In this embodiment, a light combining element 11 is arranged, for example, between the light source 200 and the wavelength conversion layer 120. The light combining element 11 is a dichroic mirror, for example. The light combining element 11 is configured to allow the beam L1 (as well as the non-converted beam L3) to pass therethrough and reflect the converted beam L2. The transmission path of the converted beam L2 and the non-converted beam L3 is further provided with other optical guiding elements, such as a plurality of lenses 12 and a plurality of mirrors 13, to guide the converted beam L2 and the non-converted beam L3 to the wavelength selection layer 140.

The light valve 20 of this embodiment is, for example, a digital micromirror device (DMD), a liquid crystal on silicon (LCoS), or a liquid crystal display (LCD), but the disclosure is not limited thereto. In addition, a light homogenizing element 14 can be arranged between the composite color wheel module 100*f* and the light valve 20.

The projection device 1 of this embodiment has the advantages of being lightweight, small in size, and good reliability due to the use of the composite color wheel module 100*f*. Therefore, the selection of the motor 180 and the optical path design for the projection device 1 can increase, and thus improve the reliability of the projection device 1. It is understood that in addition to being used in conjunction with the composite color wheel module 100*f* as shown in FIGS. 12A and 12B, the projection device 1 of the embodiment of the disclosure can also be used in conjunction with other composite color wheel modules, such as the composite color wheel modules 100, 100*a*, 100*b*, 100*c*, 100*d*, 100*e*, 100*g*, 100*h*, 100*i* of the embodiments, and the optical path design can be adjusted accordingly according to the selected composite color wheel module. The following will illustrate another optical path design with a projection device 1*k* adopting another composite color wheel module 100*k*.

Figure 13:
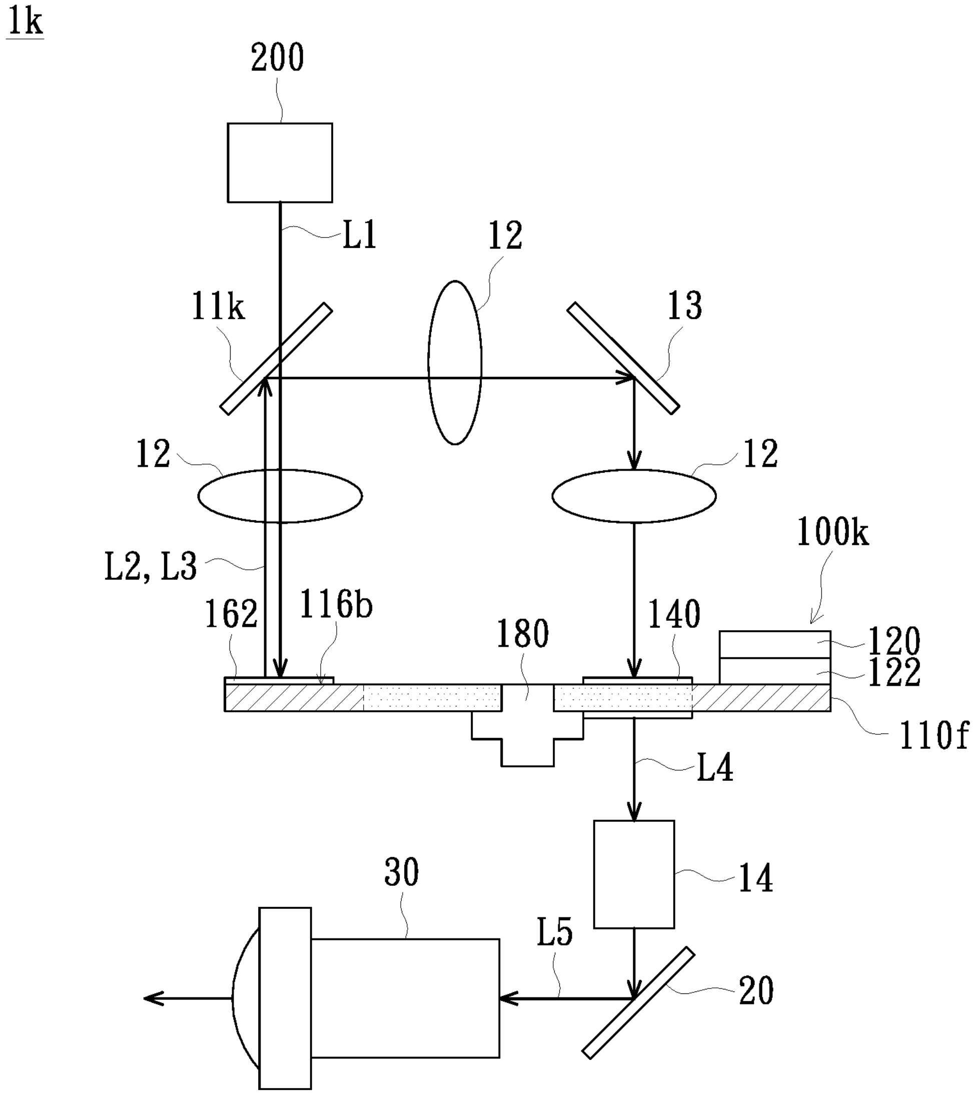
FIG. 13 is a schematic view of an optical path of a projection device according to another embodiment of the disclosure.

FIG. 13 is a schematic view of an optical path of a projection device according to another embodiment of the disclosure. Please refer to FIGS. 12B and 13. The composite color wheel module 100*k* of this embodiment is similar to the composite color wheel module 100*f* of FIG. 12B. The main difference is that the wavelength maintenance region 116*b* of the composite color wheel module 100*k* in this embodiment is a reflection region and a reflection layer 162 is provided, for example. The light combining element 11*k*, for example, has a coherent light source penetration region and a reflection region. The beam L1 passing through the light combining element 11*k* takes turns irradiating the wavelength conversion layer 120 and the wavelength maintenance region 116*b* when the substrate 110*f* rotates. As shown in FIG. 13, the beam L1 is transmitted to the wavelength maintenance region 116*b* and is reflected by the reflection layer 162 to the light combining element 11*k* (hereinafter the non-converted beam L3 represents the beam reflected by the reflection layer 162 of the wavelength maintenance region 116*b*). The non-converted beam L3 is reflected by the light combining element 11*k* and then guided to the wavelength selection layer 140 by the optical guiding element, such as the lens 12 and the mirror 13. On the other hand, the beam L1 transmitted to the wavelength conversion layer 120 is converted into a converted beam L2 (shown in FIG. 12A) by the wavelength conversion layer 120. The converted beam L2 is reflected by the light combining element 11*k* and then guided to the wavelength selection layer 140 by the optical guiding element, such as the lens 12 and the mirror 13.

In summary, compared to the structure formed by splicing two separated substrates (i.e., filter substrate and fluorescent substrate), the composite color wheel module in the embodiment of the disclosure uses a single substrate to carry a wavelength conversion layer and a wavelength selection layer, which can reduce volume and weight, improve structural design diversity and reliability, and thus increase the number of motor types and optical path designs available for the projection device using this composite color wheel module, and improve the reliability of the projection device.

The foregoing description of the preferred embodiment of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the invention" or the like is not necessary limited the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. A composite color wheel module, comprising:

a substrate, comprising a wavelength conversion region and a wavelength selection region, wherein a material of the substrate is selected from at least one of nitrogen alumina, magnesium oxide, magnesium aluminum spinel, yttrium aluminum garnet, aluminum nitride, beryllium oxide, yttrium oxide, yttrium zirconium dioxide, gallium arsenide, zinc sulfide, zinc selenide, magnesium fluoride, and calcium fluoride;

a wavelength conversion layer, arranged in the wavelength conversion region; and a wavelength selection layer, arranged in the wavelength selection region, wherein a surface of the wavelength selection region has a first surface roughness less than 0.02 um, wherein a surface of the wavelength conversion region has a second surface roughness greater than the first surface roughness.

2. The composite color wheel module according to claim 1, further comprising an anti-reflection layer, wherein the substrate further comprises a wavelength maintenance region, the anti-reflection layer is arranged in the wavelength maintenance region, the wavelength maintenance region is connected to the wavelength conversion region, the wavelength maintenance region and the wavelength conversion region form a ring on the substrate, and a surface roughness of a surface of the substrate corresponding to the wavelength maintenance region is equal to the first surface roughness.

3. The composite color wheel module according to claim 1, further comprising a reflection layer, wherein the substrate further comprises a wavelength maintenance region, the reflection layer is arranged in the wavelength maintenance region, the wavelength maintenance region is connected to the wavelength conversion region, and the wavelength maintenance region and the wavelength conversion region form a ring on the substrate.

4. The composite color wheel module according to claim 1, further comprising a reflection layer arranged between the wavelength conversion layer and the substrate.

5. The composite color wheel module according to claim 4, further comprising an adhesive layer arranged between the wavelength conversion layer and the reflection layer.

6. The composite color wheel module according to claim 1, wherein a transmittance of the wavelength selection region of the substrate is between 80% and 100%.

7. The composite color wheel module according to claim 1, wherein a thermal conductivity of the substrate is between 20 and 500 W/m·K.

8. The composite color wheel module according to claim 1, wherein a refractive index of the substrate is between 1.2 and 1.8, a heat resistance temperature of the substrate is between 120° and 2800° C., a hardness of the substrate is between 40 and 1950 kg/mm$^2$, and a density of the substrate is between 1.7 and 4 g/cm$^3$.

9. The composite color wheel module according to claim 1, further comprising a motor, wherein the substrate is connected to the motor, and the substrate is a circular ring substrate.

10. A projection device, comprising an illumination system, a light valve, and a projection lens, the illumination system being configured to provide an illumination beam, the light valve being arranged on a transmission path of the illumination beam to convert the illumination beam into an image beam, the projection lens being arranged on a transmission path of the image beam, and the illumination system comprising:

a light source, configured to provide a beam; and a composite color wheel module, arranged on a transmission path of the beam and comprising:

a substrate, comprising a wavelength conversion region and a wavelength selection region, wherein a material of the substrate is selected from at least one of nitrogen alumina, magnesium oxide, magnesium aluminum spinel, yttrium aluminum garnet, aluminum nitride, beryllium oxide, yttrium oxide, yttrium zirconium dioxide, gallium arsenide, zinc sulfide, zinc selenide, magnesium fluoride, and calcium fluoride;

a wavelength conversion layer, arranged in the wavelength conversion region and configured to convert a portion of the beam into a converted beam; and a wavelength selection layer, arranged in the wavelength selection region, wherein a surface of the wavelength selection region has a first surface roughness less than 0.02 um, the wavelength selection layer is arranged on a transmission path of the converted beam and configured to generate at least a portion of the illumination beam, wherein a surface of the wavelength conversion region has a second surface roughness greater than the first surface roughness.

* * * * *